US008677414B2

(12) United States Patent
Beck

(10) Patent No.: US 8,677,414 B2
(45) Date of Patent: Mar. 18, 2014

(54) APPARATUS AND METHOD FOR MANAGING MESSAGES OF COMMUNICATION DEVICES

(75) Inventor: Gregory Beck, Coppell, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1610 days.

(21) Appl. No.: 11/780,718

(22) Filed: Jul. 20, 2007

(65) Prior Publication Data
US 2009/0022292 A1 Jan. 22, 2009

(51) Int. Cl.
*G06F 3/00* (2006.01)
(52) U.S. Cl.
USPC ............... 725/46; 725/32; 725/45; 725/47
(58) Field of Classification Search
None
See application file for complete search history.

(56) References Cited

U.S. PATENT DOCUMENTS

| 5,848,396 | A | * | 12/1998 | Gerace | 705/7.33 |
|---|---|---|---|---|---|
| 5,907,604 | A | | 5/1999 | Hsu | |
| 2003/0086432 | A1 | | 5/2003 | Bartfeld et al. | |
| 2006/0041923 | A1 | * | 2/2006 | McQuaide, Jr. | 725/131 |
| 2006/0174307 | A1 | * | 8/2006 | Hwang et al. | 725/132 |
| 2007/0271582 | A1 | * | 11/2007 | Ellis et al. | 725/46 |
| 2009/0044226 | A1 | * | 2/2009 | Ellis et al. | 725/46 |

* cited by examiner

*Primary Examiner* — Cai Chen
(74) *Attorney, Agent, or Firm* — Guntin & Gust, PLC; Ralph Trementozzi

(57) ABSTRACT

A system that incorporates teachings of the present disclosure may include, for example, a set top box having a controller to present media content to a user, receive a message, and selectively cease presentation of the media content until after the message is reviewed. Additional embodiments are disclosed.

30 Claims, 5 Drawing Sheets

100

200

US 8,677,414 B2

APPARATUS AND METHOD FOR MANAGING MESSAGES OF COMMUNICATION DEVICES

FIELD OF THE DISCLOSURE

The present disclosure relates generally to communication systems, and more specifically to an apparatus and method for managing messages of communication devices.

BACKGROUND

Messages left for individuals can often go unattended for a period of time regardless of the urgency of the content of the message. Call forwarding systems attempt to alleviate this problem by forwarding the call or message to a communication device that the user may be more likely to answer or more likely alerted to the receipt of the message. However, such systems do not alert the user as to the urgency of the content of the message. Additionally, such systems are ineffective where the intended recipient of the message is avoiding or is otherwise disinterested in reviewing a message.

DETAILED DESCRIPTION

In a first embodiment of the present disclosure, a computer-readable storage medium can have computer instructions for receiving a user profile, presenting media content according to the user profile; receiving a message at a set top box; determining whether a user is a targeted user of the message based at least in part on the user profile, and ceasing presentation of the media content where the user is the targeted user of the message.

In a second embodiment of the present disclosure, a communication device can have a controller to communicate a message to a set top box, and communicate a target code to the set top box. The presentation of media content by the set top box can be ceased where a user is a targeted user of the message. The set top box can determine whether the user is the targeted user based in part on the target code.

In a third embodiment of the present disclosure, a set top box can have a controller to present media content to a user, receive a message, and selectively cease presentation of the media content until after the message is reviewed.

In a fourth embodiment of the present disclosure, a method of managing messages can involve providing access to media content based at least in part on a user profile, receiving a message; determining whether a user is a targeted user of the message based at least in part on the user profile, and ceasing presentation of the media content where the user is the targeted user of the message.

Figure 1:
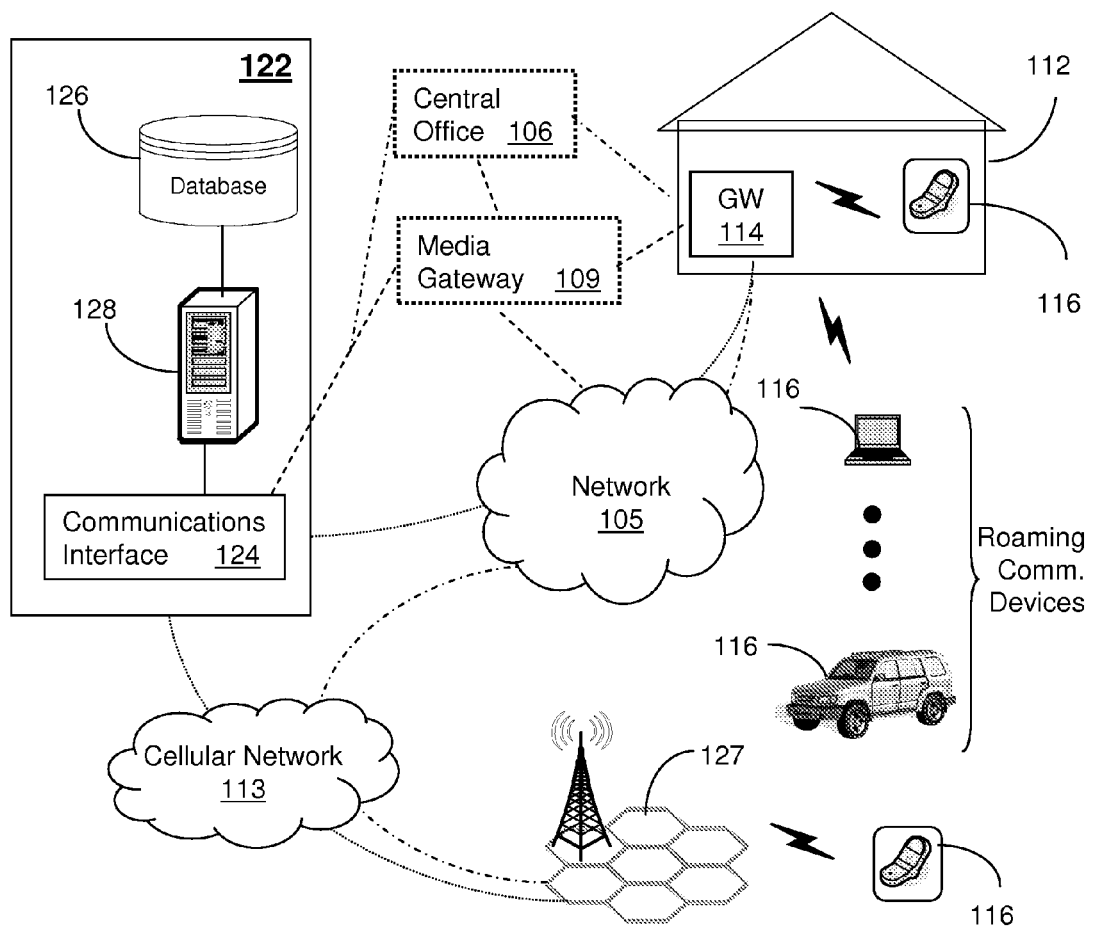
FIGS. 1 and 2 depict exemplary embodiments of a communication system.

FIG. 1 depicts an exemplary embodiment of a mobile communication device 116 communicating by way of wireless access points (WAPs) and/or wired infrastructure with other communication devices and/or a network proxy or web server 122, which collectively operate in a communication system 100. The communication device 116 can be a multimode communication device, such as a multimode VoIP terminal. However, the present disclosure contemplates the use of other types of communication devices, including other types of voice, video and data devices. The communication system 100 can comprise a packet-switched network 105. The packet-switched network can be an Internet Service Provider (ISP) network 105. The network 105 can be coupled to the network proxy 122, the cellular network 113 and network elements located in one or more of the buildings 112 representing an enterprise or residence. The ISP network 105 utilizes technology for transporting Internet traffic.

In an enterprise setting, the building 112 can include a gateway 114 that provides voice and/or video connectivity services between communication devices 116, such as VoIP terminals or other forms of communication devices of enterprise personnel. In a residential setting, the building 112 can include a gateway 114 represented by, for example, a residential gateway coupled to central office 106 utilizing conventional telephonic switching for processing calls with third parties.

The network proxy 122 can be used to control operations of a media gateway 109, the central office 106 and the gateway 114. Communications between the network proxy 122, the communication devices 116 and other network elements of the communication system 100 can conform to any number of signaling protocols such as a session initiation protocol (SIP), SS7, or a video communications protocol such as H.323 which combines video and voice over a packet-switched network, as well as cryptographic protocols, such as transport layer security (TLS) or secure sockets layer (SSL), to provide secure communications for data transfers.

The network proxy 122 can comprise a communications interface 124 that utilizes common technology for communicating over an IP interface with the network 105, the media gateway 109, the cellular network 113, and/or the gateway 114. By way of the communications interface 124, the network proxy 122 can direct by common means any of the foregoing network elements to establish packet switched data, voice, and/or video connections between communication devices 116 distributed throughout the communication system 100. The network proxy 122 can further comprise a memory 126 (such as a high capacity storage medium) embodied in this illustration as a database, and a controller 128 that makes use of computing technology such as a desktop computer, or scalable server for controlling operations of the network proxy 122. The network proxy 122 can operate as an IP Multimedia Subsystem (IMS) conforming in part to protocols defined by standards bodies such as 3GPP (Third Generation Partnership Protocol).

Under the control of the network proxy 122, the media gateway 109 can link packet-switched and circuit-switched technologies such as the cellular network 113 (or central office 106) and the network 105, such as an ISP network. The media gateway 109 can conform to a media gateway control protocol (MGCP) also known as H.248 defined by work groups in the Internet Engineering Task Force (IETF). This protocol can handle signaling and session management needed during a multimedia conference. The protocol defines a means of communication which converts data from the format required for a circuit-switched network to that required for a packet-switched network. MGCP can therefore be used to set up, maintain, and terminate calls between multiple disparate network elements of the communication system 100. The media gateway 109 can therefore support hybrid communication environments for communication devices 116, including VoIP terminals.

The central office 106 can house common network switching equipment for distributing local and long-distance telecommunication services supplied by network 105 to buildings 112 (such as dwellings or commercial enterprises). Telecommunication services of the central office 106 can include traditional POTS (Plain Old Telephone Service) and broadband services such as HDTV, DSL, VoIP (Voice over Internet Protocol), IPTV (Internet Protocol Television), Internet services, and so on. The communication system 100 can utilize common computing and communications technologies to support circuit-switched and/or packet-switched communications.

The cellular network 113 can support voice and data services over a number of access technologies such as GSM-GPRS, EDGE, CDMA-1X, UMTS, WiMAX, software defined radio (SDR), and other known and future technologies. The cellular network 113 can be coupled to base stations 127 under a frequency-reuse plan for communicating over-the-air with roaming VoIP terminals 116.

Figure 2:
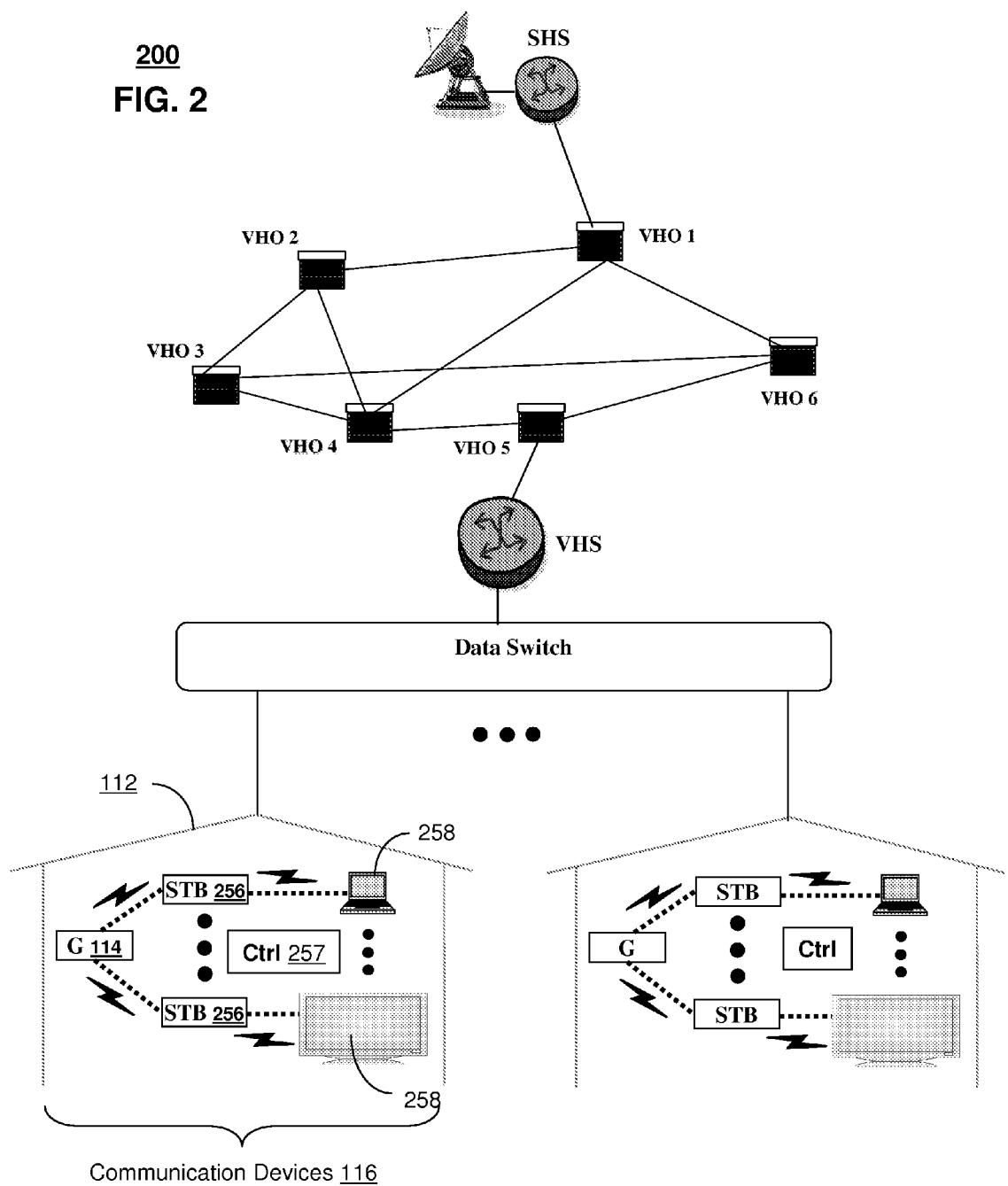

FIG. 2 depicts an exemplary embodiment of a communication system 200 embodying an IPTV service. Communication system 200 can be overlaid or operably coupled with communication system 100 as another representative embodiment of communication system 100. In a typical IPTV backbone, there is at least one super head office server (SHS) which receives national media programs from satellite and/or media servers from service providers of multimedia broadcast channels. The SHS server forwards IP packets associated with the media content to video head servers (VHS) via a network of video head offices (VHO) according to a common multicast communication method. The VHS then distributes multimedia broadcast programs to commercial and/or residential buildings 112 housing the gateway 114 (e.g., a residential gateway or RG) that distributes broadcast signals to receivers such as Set-Top Boxes (STBs) 256 which in turn present broadcast selections or media programs to media devices 258 such as computers or television units managed in some instances by a media controller 257 (e.g., an infrared or RF remote control). Unicast traffic can also be exchanged between the STBs 256 and the subsystems of the IPTV communication system 200 for services such as video-on-demand (VoD). Although not shown, the aforementioned multimedia system can also be combined with analog broadcast distributions systems.

The STB 256 can receive and/or record various types of messages from various sources. For example, the STB 256 can have message recording components so that a user can directly input a voice mail message into the STB. In another example, a text message can be inputted directly into the STB 256, such as through use of the media controller 257 or through another user interface. The present disclosure also contemplates the STB 256 having the capability of storing a combination of voice and text messages. The STB 256 can have components for receiving messages (e.g., voice or text messages) from remote sources, including via wireless and/or wireline communications, including a receiver, antenna, and others. For example, a user can leave a voice or text message with the STB 256 using his or her cellular phone or other communication device (e.g., using a computer to provide an e-mail message).

Figure 3:
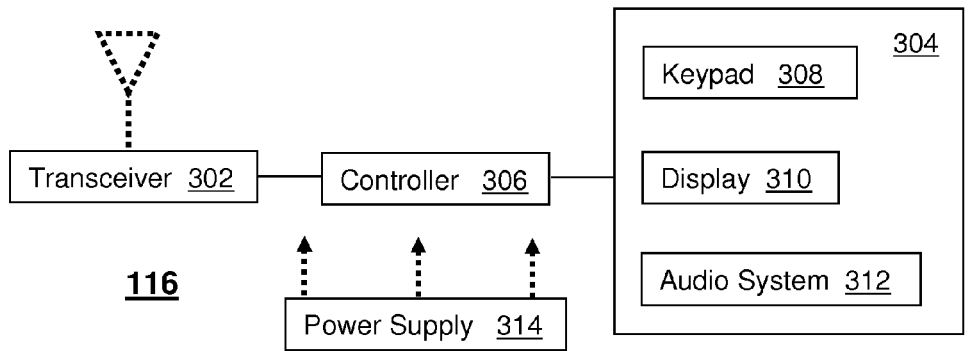
FIG. 3 depicts an exemplary embodiment for a communication device operating in portions of one or both of the communication systems.

FIG. 3 depicts an exemplary embodiment of the wireless communication device 116. The communication device 116 can comprise a wireless transceiver 302, a user interface (UI) 304, a power supply 314, and a controller 306 for managing operations thereof. The transceiver 302 can utilize common technologies to support singly or in combination any number of wireless access technologies including without limitation cordless phone technology (e.g., DECT), Bluetooth™, Wireless Fidelity (WiFi), Worldwide Interoperability for Microwave Access (WiMAX), Ultra Wide Band (UWB), software defined radio (SDR), and cellular access technologies such as CDMA-1X, W-CDMA/HSDPA, UMTS, GSM/GPRS, TDMA/EDGE, and EVDO. SDR can be utilized for accessing a public or private communication spectrum according to any number of communication protocols that can be dynamically downloaded over-the-air to the communication device 116. It should be noted also that next generation wireless access technologies can be applied to the present disclosure.

The UI 304 can include a keypad 308 with depressible or touch sensitive navigation disk and keys for manipulating operations of the communication device 116. The UI 304 can further include a display 310 such as monochrome or color LCD (Liquid Crystal Display) for conveying images to the end user of the communication device 116, and an audio system 312 that utilizes common audio technology for conveying and intercepting audible signals of the end user.

The power supply 314 can utilize common power management technologies such as replaceable batteries, supply regulation technologies, and charging system technologies for supplying energy to the components of the communication device 116 and to facilitate portable applications. In stationary applications, the power supply 314 can be modified so as to extract energy from a common wall outlet and thereby supply DC power to the components of the communication device 116. The controller 306 can utilize computing technologies such as a microprocessor and/or digital signal processor (DSP) with associated storage memory such a Flash, ROM, RAM, SRAM, DRAM or other like technologies for controlling operations of the aforementioned components of the communication device 116. The memory of the controller 306 can have personalized data stored therein including contact book entries, calendar entries, still pictures, ring tones, wallpapers, music, video recordings, movies and games.

Figure 4:
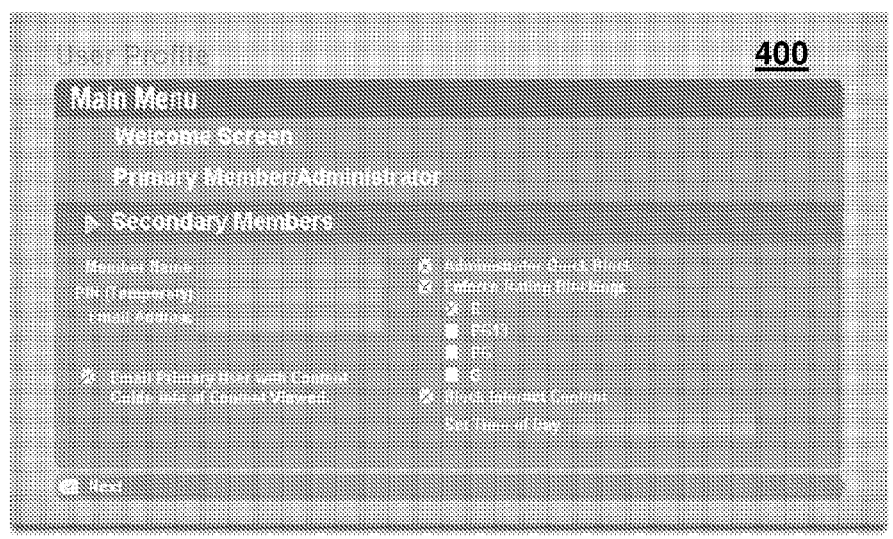
FIG. 4 depicts an exemplary embodiment of a graphical user interface for a user profile associated with one or both of the communication systems.

FIG. 4 depicts an exemplary embodiment of a Graphical User Interface (GUI) of a display on the media device 258 for provisioning user profiles associated with the set top box 256. The present disclosure contemplates the use of other graphical user interfaces to facilitate the provisioning process. For example, in FIG. 4 the GUI 400 can present a welcome screen and an initial preview of what needs to be done to configure the STB 256 for multi-user profiles. The STB 256 can request an identification of a primary member, which in the present context can be an administrator of the STB, and an identification of one or more secondary members, which can represent limited users of the STB. An administrator can have full privileges to manage the operation of the STB 256 on a per user basis, while limited users can have control and management over their own user profiles to the extent allowed by the administrator.

In one embodiment, the administrator can begin the process of provisioning the user profiles for each shared user of the STB 256 by applying one or more configuration settings. The configuration settings for the user profile can be selected from a group of features supported by the STB 256 and at least one service provider of a communication network from which the STB operates. The administrator, such as by way of the media controller 257, can input the configuration settings which are received by the STB 256 for setting up individual user accounts. The administrator can configure each user account with rights and permissions for accessing the multimedia content. In such regard, the administrator can individually limit or individually restrict a user's access to media content delivered to media devices 258.

The administrator can also delegate to each user, through their respective user profile, access to the configuration settings. This allows each user to customize their own user profile with user preferences in accordance with the limits established by the administrator. As one example, the administrator can establish parental controls in the user profiles such as those which limit viewing of certain programs, or impose other blocks such as by channel, time, content, or rating. The limited user can further customize the user profile for personal access to the multimedia content, for example, by arranging movies or news groups in order of favorites, adjusting audio settings, or modifying friends lists, to name a few. The administrator can also elect to receive email messages associated with any changes made to the user profile, for example, those made after the administrator has configured the user profiles.

Figure 5:
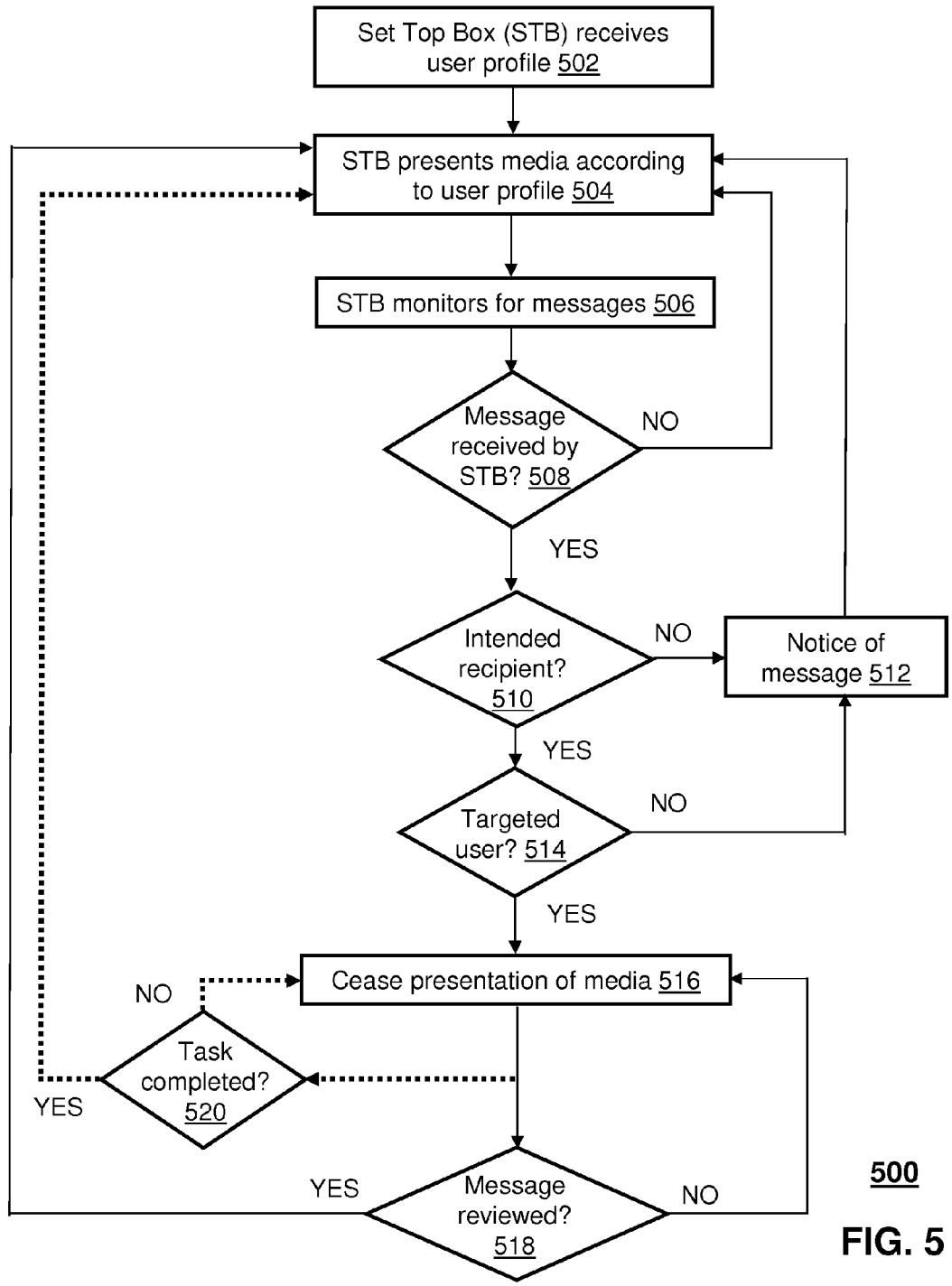
FIG. 5 depicts an exemplary method operating in portions of one or both of the communication systems.

FIG. 5 depicts an exemplary method 500 operating in portions of one or both of the communication systems 100 and 200. Method 500 has variants as depicted by the dashed lines. It would be apparent to an artisan with ordinary skill in the art that other embodiments not depicted in FIG. 5 are possible without departing from the scope of the claims described below.

Method 500 begins with step 502 where the Set Top Box 256 receives a request to access media content (e.g., programming) through use of a user profile. For example, upon turning on the STB 256 and the media device 258 (e.g., a TV), a user can identify his or her user profile (e.g., a password or the like) to access the STB and the media content. In step 504, the STB 256 can present the media in accordance with the particular user profile. For example, if the user profile is configured with parental controls then limited programming may only be available, such as programming with a particular rating (e.g., G or PG).

In step 506, the STB 256 monitors for incoming messages, such as voice or text messages inputted directly to the STB or received from remote communication devices, such as a fixed or mobile telephones. In one embodiment, the STB 256 can have its own telephone number, internet address or other communication identification for direct communication with other communication devices. In another embodiment, the STB 256 can receive messages forwarded from one or more other communication devices, such as forwarding all messages left in your home telephone number voice mail to the STB. Various other configurations and methodologies are contemplated by the present disclosure for providing the STB 256 with messages.

In step 508, if no messages are received then the STB 256 can continue to present the media content according to the user profile as recited back in step 504. If on the other hand, a message is received then in step 510 the STB 256 can determine if the current user is the intended recipient of the message based on the user profile. For example, the STB 256 can receive a recipient code or other indicia of the intended recipient at the time the message is provided to the STB, such as an alpha-numeric code.

In step 510, if the current user is not the intended recipient of the message then the STB 256 can present a notice of receipt of the message as in step 512 and can continue to present the media content according to the user profile as recited back in step 504. If on the other hand, the current user is the intended recipient of the message then in step 514 the STB 256 can determine if the current user is a targeted user based on the user profile. The targeted user can be an individual or group of users that are intended to at least listen to the message prior to any more media content being presented by the STB 256. For example, a targeted user can be a child where a message is provided by a parent indicating that homework is to be completed before the parent comes home. The particular type of targeted user can be dependent upon the type of message. For example, a message from one parent to another parent to pick up the children can be provided to the STB 256 and the parent user can be the targeted user.

Establishing a targeted user can be can be done based upon a selection by the individual leaving the message and/or by a pre-selection (e.g., according to the user profile). For example, the STB 256 can receive a target code or other indicia of the targeted user at the time the message is provided to the STB. In one embodiment, an alpha-numeric code can be entered following the message being provided to the STB 256. The alpha-numeric code can indicate the particular individual or group of users that are to be targeted by the message and which can be selected by the STB 256 based upon their user profiles. The target code can be the same as the recipient code described above, or can be an additional code, such as where a message is meant for multiple recipients but only some of those recipients are targeted users.

In another example, the targeted user can be pre-selected according to an identity of the individual providing the message, such as an alpha-numeric code being entered following the message being provided to the STB 256. In one embodiment, the STB 256 can retrieve all targeted users based upon the alpha-numeric code entered and the user profile for the STB associated with the alpha-numeric code provided by the individual leaving the message.

If the message is not for a targeted user then the notice of receipt of the message can be presented by the STB 256 as recited back in step 512. For example, a visual or oral indicator of receipt of the message can be temporarily presented on the media device 258, such as until the message is reviewed. If on the other hand, the message is for a targeted user then in step 516 the STB 256 can cease presentation of the media content. In step 518, the STB 256 can monitor for review of the message by the targeted user. Once reviewed, method 500 can continue to present the media content as recited back in step 504. In one embodiment, the STB 256 can present notice, such as displayed on the media device 258, that the message has been reviewed. In another embodiment, the STB 256 can record the programming while the presentation has been stopped so that a user can resume watching the programming without missing any of it.

In one embodiment, the STB 256 can cease any presentation of the media content for the targeted user until such time as notice is received that the particular task associated with the message has been completed, as recited in step 520. For example, the STB 256 can cease any presentation of the media until it receives a task completion code. The task completion code can be an alpha-numeric code provided remotely by the individual who left the message and associated task, such as through a subsequent message provided to the STB 256.

From the foregoing descriptions, it would be evident to an artisan with ordinary skill in the art that the aforementioned embodiments can be modified, reduced, or enhanced without departing from the scope and spirit of the claims described below. For example, the STB 256 can distinguish between messages for targeted users that need only to be reviewed prior to continuing presentation of the media content, as compared to messages with an associated task that must be completed prior to continuing presentation of the media content, such as through use of target codes, user profiles, or combinations of both. For example, the STB 256 can categorize targeted users including those that need only to review a message prior to continuing presentation of the media content, as compared to those that must complete a task associated with the message prior to continuing presentation of the media content. In one embodiment, the type of media presented can be adjusted by the STB 256 based upon method 500. For example, certain programming may be blocked by the STB 256 until a message is reviewed or an associated task completed, such as blocking all channels that show cartoon programming until a child has reviewed the message or completed the task associated with the message. In another embodiment, reviewing of the message can be an interactive process. For example, a targeted user can be required to respond to a question as part of the message or provide other indicia that he or she has listened to the message prior to the STB 256 continuing to present the media content. The present disclosure also contemplates the submission of target and/or recipient codes to the STB 256 to be an interactive process, such as through use of voice recognition processes. These are but a few examples of the modifications that can be applied to the present disclosure without departing from the scope of the claims. Accordingly, the reader is directed to the claims for a fuller understanding of the breadth and scope of the present disclosure.

Figure 6:
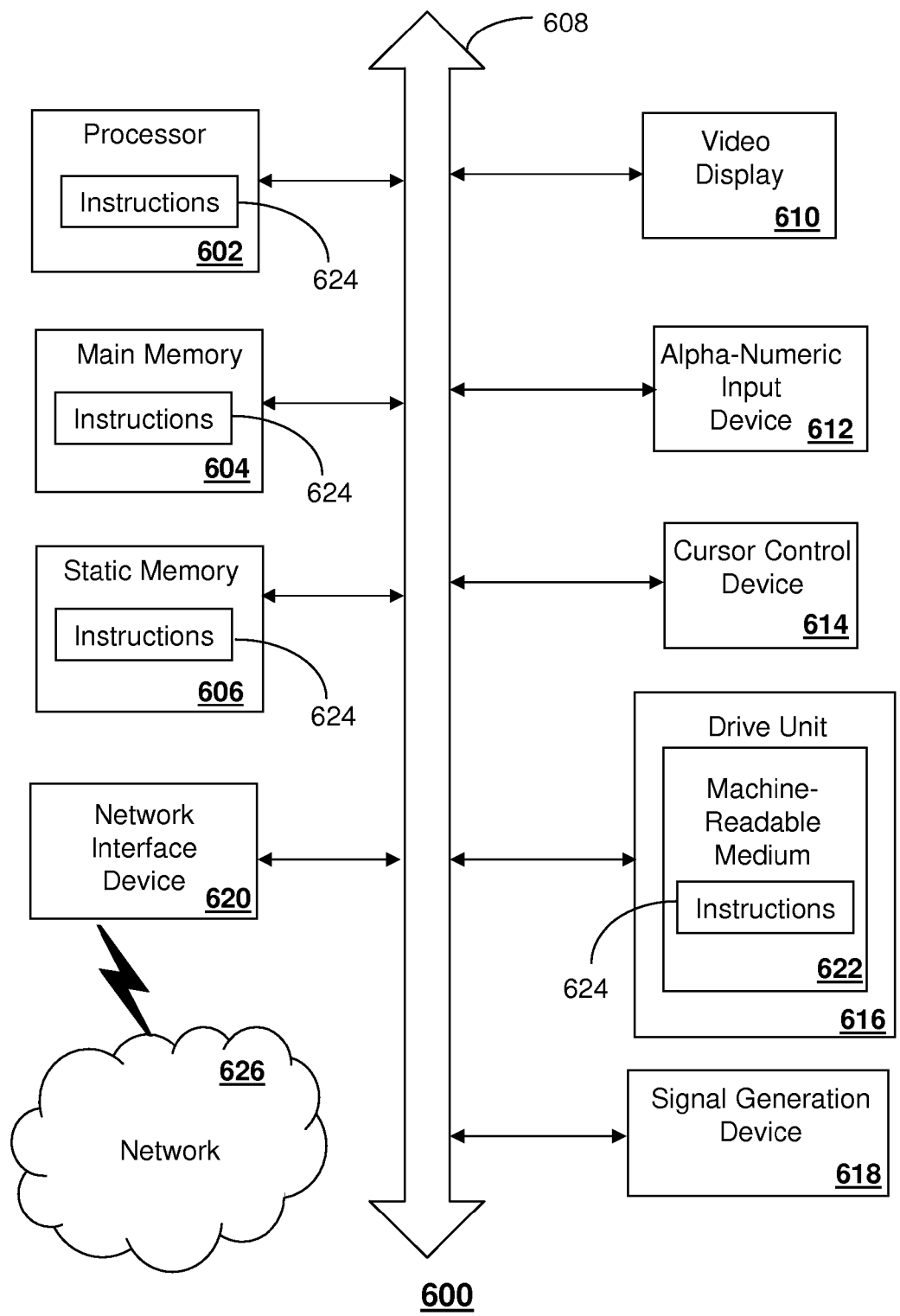
FIG. 6 depicts an exemplary diagrammatic representation of a machine in the form of a computer system within which a set of instructions, when executed, may cause the machine to perform any one or more of the methodologies disclosed herein.

FIG. 6 depicts an exemplary diagrammatic representation of a machine in the form of a computer system 600 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU, or both), a main memory 604 and a static memory 606, which communicate with each other via a bus 608. The computer system 600 may further include a video display unit 610 (e.g., a liquid crystal display (LCD), a flat panel, a solid state display, or a cathode ray tube (CRT)). The computer system 600 may include an input device 612 (e.g., a keyboard), a cursor control device 614 (e.g., a mouse), a disk drive unit 616, a signal generation device 618 (e.g., a speaker or remote control) and a network interface device 620.

The disk drive unit 616 may include a machine-readable medium 622 on which is stored one or more sets of instructions (e.g., software 624) embodying any one or more of the methodologies or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 624, or that which receives and executes instructions 624 from a propagated signal so that a device connected to a network environment 626 can send or receive voice, video or data, and to communicate over the network 626 using the instructions 624. The instructions 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer-readable storage medium, comprising computer instructions which when executed by a processor cause the processor to perform operations comprising:
   receiving a user profile;
   presenting media content at a set top box according to the user profile;
   receiving a message at the set top box;
   determining whether a user associated with the user profile is an intended recipient of the message;
   determining whether the user is a targeted user of the message based at least in part on the user profile, wherein the determination of the targeted user is based in part on assignment of a task to the targeted user that is described in the message;
   generating and presenting a message notice without presenting the message responsive to the user being the intended recipient and not the targeted user; and
   ceasing presentation of the media content responsive to the user being the intended recipient and the targeted user of the message.

2. The non-transitory storage medium of claim 1, comprising computer instructions which when executed by the processor cause the processor to perform operations comprising continuing presentation of the media content only after the message is reviewed.

3. The non-transitory storage medium of claim 1, comprising computer instructions which when executed by the processor cause the processor to perform operations comprising presenting the message when the user is the intended recipient and the target user.

4. The non-transitory storage medium of claim 1, comprising computer instructions which when executed by the processor cause the processor to perform operations comprising:
   determining whether the user is an intended recipient of the message based in part on the user profile.

5. The non-transitory storage medium of claim 4, comprising computer instructions which when executed by the processor cause the processor to perform operations comprising determining whether the user is the intended recipient of the message based at least in part on an alpha-numeric code provided with the message.

6. The non-transitory storage medium of claim 1, comprising computer instructions which when executed by the processor cause the processor to perform operations comprising presenting notice of review of the message.

7. The non-transitory storage medium of claim 1, comprising computer instructions which when executed by the processor cause the processor to perform operations comprising recording the media content during the ceasing of the presentation of the media content.

8. The non-transitory storage medium of claim 1, comprising computer instructions which when executed by the processor cause the processor to perform operations comprising determining whether the user is the targeted user of the message based at least in part on an alpha-numeric code provided with the message.

9. The non-transitory storage medium of claim 1, comprising computer instructions which when executed by the processor cause the processor to perform operations comprising receiving notice of completion of a task associated with the message and continuing presentation of the media content after receipt of the notice of completion.

10. The non-transitory storage medium of claim 9, wherein the notice of completion of the task is based on an alpha-numeric code.

11. The non-transitory storage medium of claim 1, wherein the message is a voice mail message or a text message.

12. The non-transitory storage medium of claim 1, wherein the message is received from another communication device.

13. A communication device, comprising:
   a memory having computer instructions; and
   a controller coupled with the memory, wherein executing the computer instructions causes the controller to perform operations comprising:
      communicating a message to a set top box; and communicating a target code to the set top box, wherein generation and presentation of a message notice by the set top box is accomplished without presentation of the message responsive to a user being an intended recipient and not a targeted user, wherein presentation of media content by the set top box is ceased where responsive to a user being an intended recipient and a targeted user of the message, wherein the targeted user is an entity that is assigned a task that is described in the message, and wherein the target code and the message are configured for enabling the set top box to determine whether the user is the targeted user.

14. The communication device of claim 13, wherein the set top box determines whether the user is the targeted user based in part on a user profile.

15. The communication device of claim 14, wherein the presentation of the media content by the set top box is according to the user profile.

16. The communication device of claim 15, wherein executing the computer instructions causes the controller to perform operations comprising communicating a completion code to the set top box, and wherein the set top box continues presentation of the media content pursuant to the user profile only after receipt of the completion code.

17. The communication device of claim 13, wherein the message is a voice mail message or a text message.

18. A set top box, comprising:
a memory having computer instructions; and
a controller coupled with the memory, wherein responsive to executing the computer instructions, the controller performs operations comprising:
presenting media content to a user;
receiving a message;
determining whether the user is an intended recipient of the message;
determining whether the user is a targeted user of the message based at least in part on assignment of a task to the targeted user that is described in the message;
generating and presenting a message notice without presenting the message responsive to the user being the intended recipient and not the targeted user; and
ceasing presentation of the media content until after the message is reviewed responsive to the user being the intended recipient and the target user.

19. The set top box of claim 18, wherein the controller receives a user profile, and wherein the targeted user of the message is determined based in part on the user profile.

20. The set top box of claim 19, wherein presenting the media content is accomplished according to the user profile.

21. The set top box of claim 18, wherein presenting the message is accomplished responsive to the user being the intended recipient and the target user.

22. The set top box of claim 18, wherein determining whether the user is the intended recipient of the message is based at least in part on an alpha-numeric code provided with the message.

23. The set top box of claim 18, wherein presenting notice of review of the message.

24. The set top box of claim 19, wherein determining whether the user is the targeted user of the message is based in part on an alpha-numeric code provided with the message.

25. The set top box of claim 18, wherein the message is one among a voice mail message or a text message sent to an internet protocol address associated with the set top box.

26. The set top box of claim 18, wherein executing the computer instructions causes the controller to perform operations comprising inputting the message directly into the set top box.

27. A method of managing messages, the method comprising:
providing access to media content based at least in part on a user profile, the access being provided by a media processor;
receiving a message at the media processor;
determining utilizing the media processor whether a user is an intended recipient of the message;
determining utilizing the media processor whether the user is a targeted user of the message based in part on the user profile and based in part on assignment of a task described in the message;
presenting a message notice without presenting the message responsive to the user being the intended recipient and not the targeted user; and
ceasing presentation of the media content where responsive to the user being the intended recipient and the targeted user of the message.

28. The method of claim 27, comprising utilizing the media processor to continue presentation of the media content after the message is reviewed.

29. The method of claim 27, comprising recording the media content utilizing the media processor while the presentation of the media content is ceased.

30. The method of claim 27, comprising:
receiving a target code at the media processor; and
determining whether the user is the targeted user of the message based in part on the target code.

* * * * *